June 19, 1956   C. R. ODERMANN ET AL   2,750,908
FLUID PRESSURE ACTUATED MECHANISMS FOR SEWING MACHINES
Filed Oct. 3, 1952   5 Sheets-Sheet 2

WITNESS=
William Martin

INVENTOR.
Charles R. Odermann
and Everett Poffenberger

William P. Stewart
ATTORNEY

June 19, 1956  C. R. ODERMANN ET AL  2,750,908
FLUID PRESSURE ACTUATED MECHANISMS FOR SEWING MACHINES
Filed Oct. 3, 1952  5 Sheets-Sheet 3

INVENTOR.
Charles R. Odermann
and Everett Poffenberger

WITNESS:
William Martin

William P. Stewart
ATTORNEY

June 19, 1956  C. R. ODERMANN ET AL  2,750,908
FLUID PRESSURE ACTUATED MECHANISMS FOR SEWING MACHINES
Filed Oct. 3, 1952  5 Sheets-Sheet 5

WITNESS
William Martins

INVENTORS
Charles R. Odermann
and Everett Poffenberger

Marshall J. Breen
ATTORNEY

United States Patent Office 2,750,908
Patented June 19, 1956

2,750,908
FLUID PRESSURE ACTUATED MECHANISMS FOR SEWING MACHINES

Charles R. Odermann, Milford, and Everett Poffenberger, Devon, Conn., assignors to The Singer Manufacturing Company, Elizabeth, N. J., a corporation of New Jersey Application October 3, 1952, Serial No. 312,934

9 Claims. (Cl. 112—235)

This invention relates to sewing machines, and more particularly to fluid means for regulating the operation of a work-controlling mechanism of a sewing machine.

It is one object of this invention to provide an actuating arrangement for the various instrumentalities of a sewing machine in which a single power source is utilized to provide not only a direct mechanical driving connection with the sewing machine, but also a fluid pressure system effective to operate certain of the sewing machine instrumentalities, both being under manual control of the sewing machine operator.

The present invention finds application in a wide variety of mechanisms normally employed in a sewing machine, which mechanisms require for operability a controlling force acting either to maintain the mechanism in desired normal position, or, for instance, acting through the mechanism to properly control the fabrics being stitched. This invention is of particular utility with regard to mechanisms of a sewing machine which because they must be vibrated or reciprocated, develop objectionable inertia forces particularly at high speeds.

Typical of the general class of mechanisms mentioned above are, for instance, certain forms of presser devices, either the most usual type in which the presser-foot is reciprocated because of repeated impact of an opposing four-motion feed-dog, or the alternating type of presser-device, frequently called a "walking presser-foot" which includes preferably two work-engaging portions of which each is forcibly raised and lowered alternately so as to make possible an upper feeding action with a minimum of work retardation. Despite this actuation, however it may be obtained, the presser device must be biased by an appropriate controlling force into proper work contacting position. At higher speeds the inertia forces increase, and if not compensated for, may cause the work-engaging element or elements to float ineffectively above the surface of the work. It is known in the art to provide spring pressure of sufficient magnitude so as to overcome the inertia forces at the highest expected sewing speed; however, at lower sewing speeds this spring pressure is excessive and can cause many types of fabrics to be permanently marked, and also requires a considerable amount of energy to be expended by the operator in repeated raising and lowering of the presser device. Consequently, in order to raise such spring loaded presser devices, as to insert or remove the work fabric, it is usually necessary to employ special and costly mechanism by which the machine operator may overcome the excessive heavy spring pressure.

It is an object of this invention to provide a convenient and economical fluid pressure means associated with a sewing machine for delivering a controlling force to any suitable mechanism thereon, such controlling force being variable directly with the speed of the sewing machine to counteract automatically the variation in objectionable inertia forces.

The invention both in structure and in operation as well as the additional objects and advantages thereof, will be best understood from the following description taken in conjunction with the accompanying drawings, in which.

Figure 1:
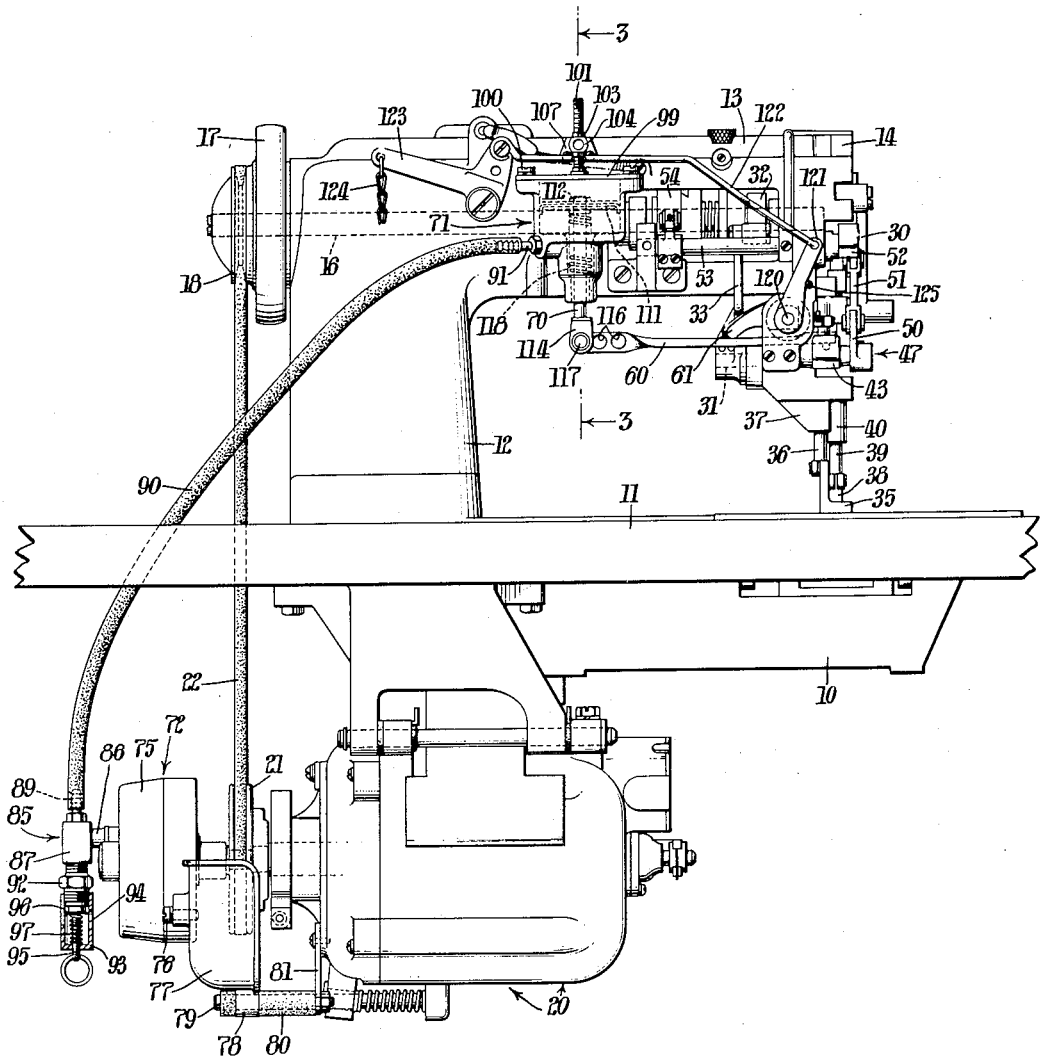
Fig. 1 represents a rear side elevation of a sewing machine complete with a power transmitter therefor, and having the present invention applied thereto.

Referring more particularly to the drawings, the invention, in preferred form, is applied to a needle-feed chain-stitch sewing machine having an alternating presser mechanism. The sewing machine frame comprises a bed 10 recessed in a power table top 11, a standard 12 rising vertically from the bed, and a bracket-arm 13 which overhangs the bed and terminates in a sewing head 14 normally closed by an end cover-plate 15. A main shaft 16 journaled in the bracket-arm has fixed at its standard end a balance wheel 17 formed with a belt pulley 18.

Depending from the power table top is an electric motor and power control unit, which together are termed a power transmitter indicated generally as 20. This power transmitter is shown and described in the patent of Turner, No. 2,597,685, May 20, 1950, to which reference may be had for a more complete disclosure thereof. For present purposes, it is sufficient to note that this transmitter is of the type having a clutch and brake control (not shown) for regulating, at the will of the machine operator, the speed of a clutch pulley 21 associated with the power transmitter. The clutch pulley is connected in direct driving relation with the balance wheel pulley 18 by by means of a belt 22.

Figure 2:
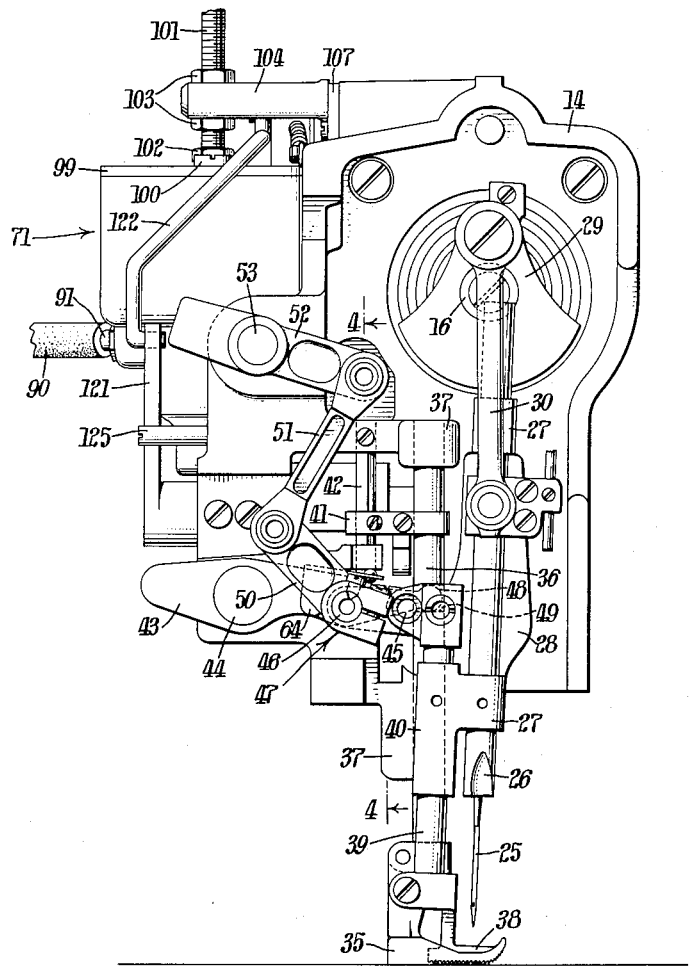
Fig. 2 is a left end elevational view of the sewing machine head of Fig. 1.

As best illustrated in Figs. 1 and 2, the stitch-forming instrumentalities of the sewing machine include a needle 25 carried by a needle-bar 26 which is reciprocated endwise and is also vibrated laterally in the line of feed to assist in the feeding of the work. The needle bar is journaled for endwise reciprocation in spaced bearings 27—27 formed in a rocking frame 28, and is reciprocated by means of a counterbalanced crank 29 on the main shaft and an actuating link 30. Vibratory feeding movement is imparted to the needle bar by way of the rocking frame 28 which is fast on a fulcrum rod 31 and is driven from an adjustable eccentric (not shown) on the main shaft by means of a pitman 32 which is connected to a rock lever 33 fast on the fulcrum rod.

The alternating presser mechanism comprises generally, a presser-foot 35 carried by a vertically movable presser-bar 36 which is journaled in bearing 37—37 in the sewing head. There is also provided an upper feeding foot 38 carried by a feed-bar 39 which is journaled for endwise reciprocation in a bearing lug 40 formed on the needle-bar rocking frame 28. Turning of the presser-bar 36 is prevented by means of a guide bracket 41 which is fast on the presser-bar and slidingly embraces a vertically arranged guide rod 42.

In order to adapt the presser mechanism for feeding the work, a driving mechanism is provided for alternating lifting and lowering the presser-foot and the upper feeding foot. As best illustrated in Fig. 2, this mechanism comprises a rocking lifting lever 43 pivotally mounted on a fulcrum stud 44 in the sewing head and connected by pin 45 to the feed-bar 39. Pivoted to the rocking lifting lever 43 by means of a stud shaft 46 is a presser-bar lifting lever indicated generally as 47. One arm 48 of lever 47 extends within a slot 49 in the presser-bar 36, while the other arm 50 is connected by a link 51 to a rock lever 52 carried by a rock-shaft 53 journaled horizontally in the bracket-arm 13. The rock shaft is oscillated by means of a pitman 54 which embraces an adjustable eccentric (not shown) on the main shaft 16.

A blade member 60 arranged generally horizontally of the overhanging bracket-arm is fulcrumed on the extremity of a fulcrum finger 61 which is fixed in the sewing head 14. The blade member constitutes a simple lever of the first class, and as will be described in detail hereinbelow, serves to apply a downward force to the rocking lifting lever 43. A steel ball 63, held in place by a retainer member 64, is interposed between the blade member 60 and the lever 43 in order to prevent the exertion of any side thrust upon the lever 43.

It will be understood from the above that insofar as the alternating presser mechanism is concerned, downward force applied by the blade member 60 to the lever 43 normally urges the upper feeding foot 38 into engagement with the work. Upon oscillation of the rock-shaft 53, and through the linkage represented by the rock lever 52, the link 51, and the presser lifting lever 47, the presser-bar 36 is alternately raised and lowered. When the presser-foot is raised above the work fabric, the presser lifting lever 47 turns about stud shaft 46 as a fulcrum. However, during that portion of each cycle of operation in which the presser-foot is lowered into contact with the work, the point of contact between arm 48 and the presser-bar slot 49 becomes the fulcrum for turning movement of lever 47, and continued turning movement thereof serves by means of the stud shaft 46 to turn the rocking lifting lever and thus to raise the feeding foot. The mechanism is, of course, timed so as to lift the feeding foot during its forward return movement and to lower the feeding foot during its rearward movement so as to effect a proper feeding action.

For a more complete understanding of the above described alternating presser construction reference may be made to the Zeier Patent No. 2,428,762, October 7, 1947, or the Zeier Patent No. 2,625,895, January 20, 1953.

Since each of the work-engaging feet are purposely raised and lowered at each stitch, it will be apparent that at higher sewing speeds such as are expected of modern sewing machines, exceedingly objectionable inertia forces will develop. It is not uncommon for such inertia forces to reach sufficient magnitude so as to overcome the downward controlling force, in which cases the presser mechanism appears to "paw the air" above the work fabric.

In the preferred embodiment of the invention, a pneumatic motor is employed to provide the controlling force which is applied to the presser mechanism. As illustrated in Fig. 1, the blade member 60 of the presser mechanism is operatively connected to a piston rod 70 extending from an air cylinder 71 of the pneumatic motor to which air is delivered under pressure from a pneumatic pump indicated generally as 72.

Preferably, the pump 72 is of a type in which the pressure of the air delivered, within the capacity of the pump, varies directly with the speed at which the pump is operated. Most centrifugal pumps would possess such characteristics; however, in the preferred embodiment, a rotary vane type pump is employed, which pump has been found to meet this requirement. The pump comprises a rotary vane portion 73 which is operatively connected for rotation with the clutch pulley 21. A stationary housing 75 of the pump is fixed by fastening screws 76 to a cupped belt-guarding bracket 77 which is in turn formed with a bifurcated tang 78 to receive a fastening pin 79 fitted with a flexible sleeve 80 by which the pump housing and belt guard bracket are secured to a support plate 81 which depends from the power transmitter. For a more detailed disclosure and description of the air pump, reference is made to patent application of Reynold Happe, Serial No. 134,958, filed December 24, 1949, now Patent No. 2,721,692, dated October 25, 1955. It is sufficient that it be clearly understood for purposes of the present invention, that the speed of the pneumatic pump will vary in a direct proportion to any change in the speed of operation of the sewing machine, since each is operated directly from clutch pulley 21.

In order for the desired proportionality between pressure and speed to be realized, it is necessary that the pump be connected to discharge against a static pressure head, that is, the pump must discharge into a closed system.

Figures 5, 6:
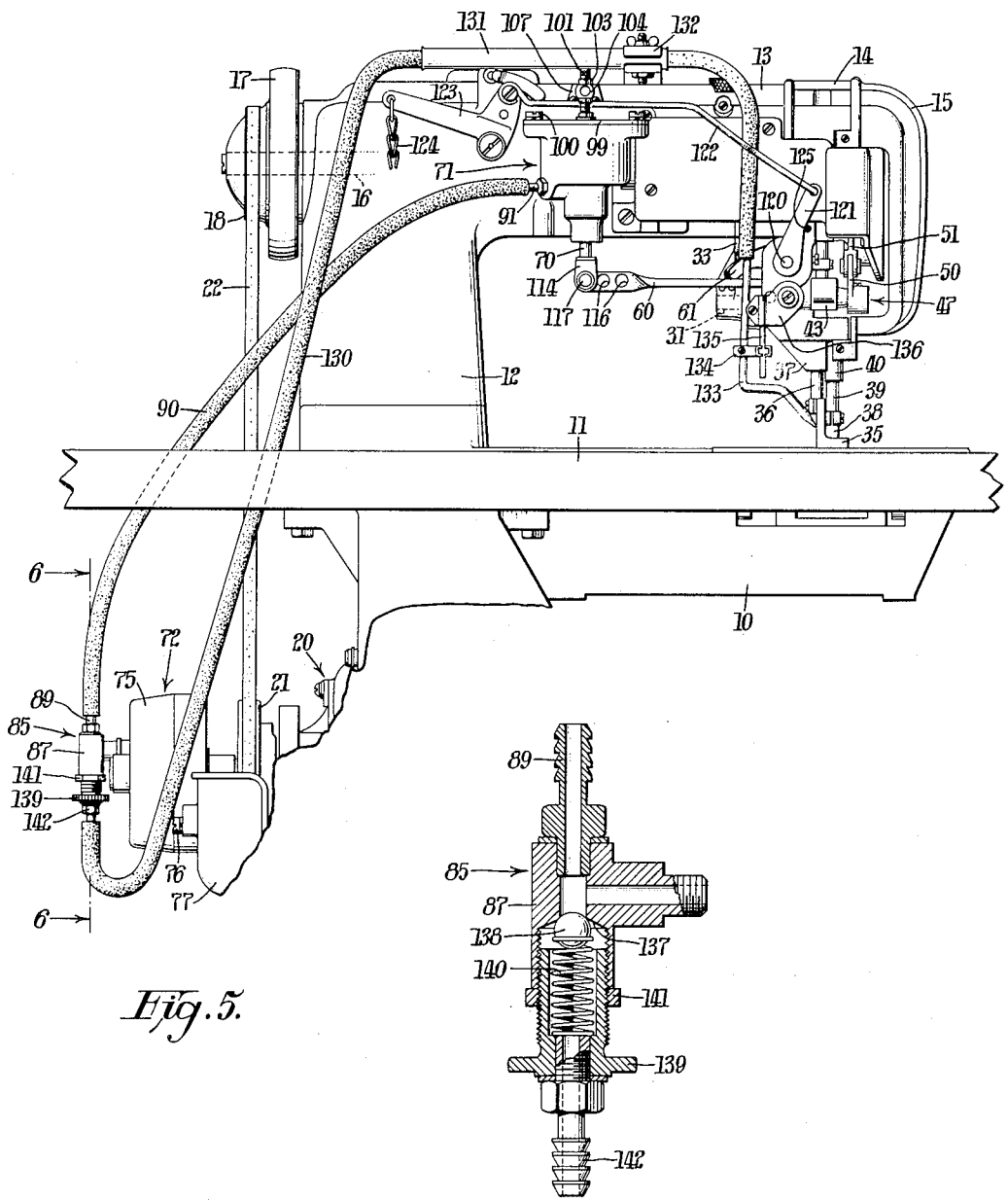
Fig. 5 represent a rear side elevation of a sewing machine with portions of the transmitter broken away and illustrating a modified form of construction.
Fig. 6 is an enlarged vertical sectional view taken substantially along line 6—6 of Fig. 5, showing a modified form of pressure relief valve.
Figure 7:
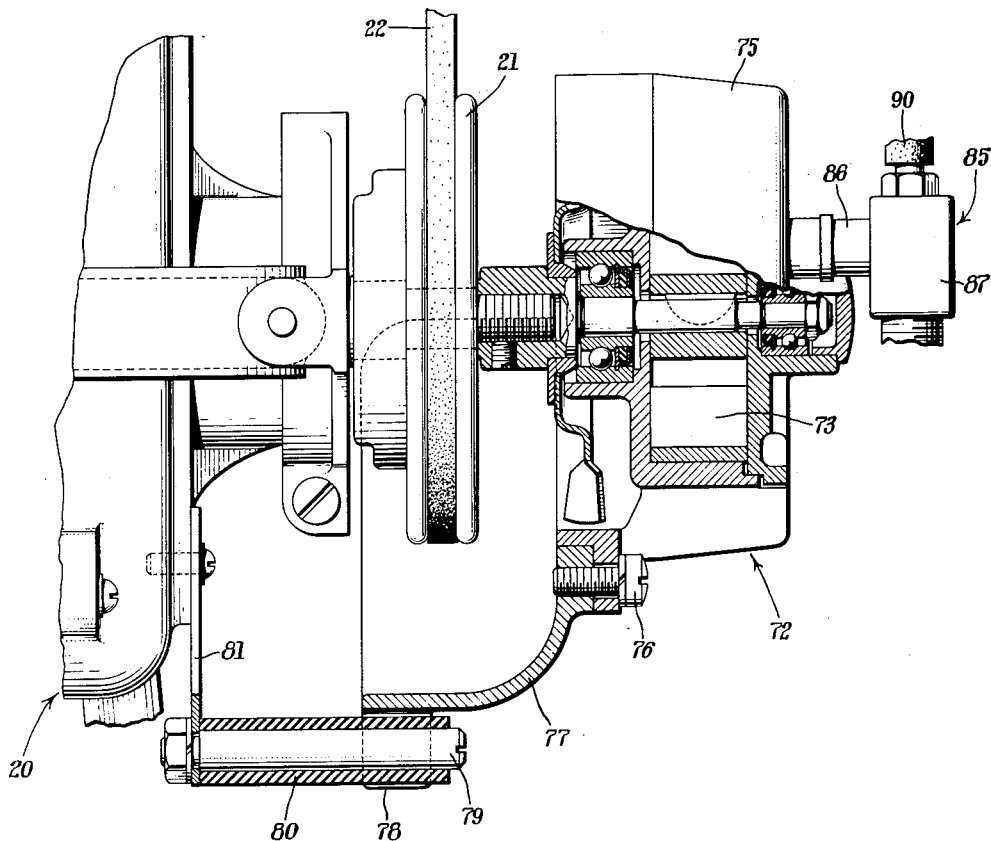
Fig. 7 represents an enlarged view of the pump and a portion of the transmitter of Fig. 1 partly in vertical cross section.

The present system is rendered a closed or static head pressure system by means of a valve as shown in Figs. 1 and 6, and indicated generally as 85 which is arranged at the discharge outlet 86 of the air pump. The valve comprises a hollow body portion 87 which opens to the discharge outlet 86 of the pump. In communication with the hollow body portion of the valve is a hose fitting 89 adapted to receive a flexible hose 90 which is directed to a similar hose fitting 91 provided in communication with the air cylinder 71. Threaded into the body portion of the valve is one end of a nipple 92 which at its other end is threaded to accommodate an end cap 93 which is formed with side perforations 94. Slidably arranged in the end cap is a pin 95 which is provided with a flange 96 adapted normally to close the opening in the nipple 92. Confined between the flange 96 and the end cap 93 is a coil spring 97 which biases the flange in place over the opening in the nipple. By turning the end cap 93, a fine adjustment of spring pressure may be obtained so as to provide means for regulating the maximum air pressure which may exist in the air cylinder beyond which the flange 96 will be shifted aside and the air under the excess pressure will be permitted to escape through the side perforations 94—94. The valve is preferably adjusted so as to provide a maximum air pressure corresponding to that required at the maximum speed to be expected of the sewing machine. At any lower speed, therefore, the system will be closed to the atmosphere and the air pressure delivered by the pump will vary in a direct proportion to the speed of operation of the sewing machine. When the maximum desired pressure is reached, however, the valve will operate to bleed the excess away so as to prevent damage to the system.

Figure 3:
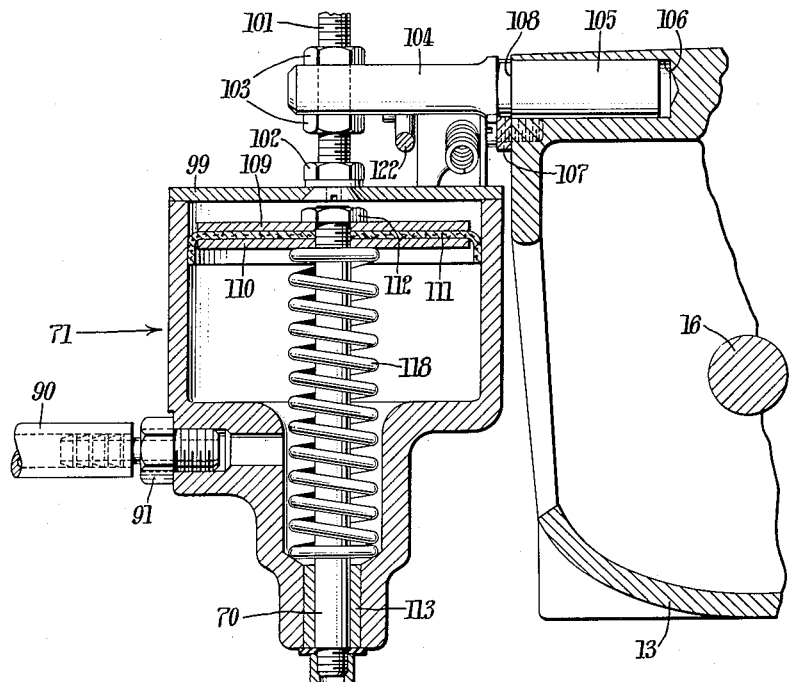
Fig. 3 is an enlarged vertical sectional view taken substantially along line 3—3 of Fig. 1 and showing the construction of the air cylinder.

Fig. 3 best illustrates the details of construction of the pneumatic motor. The cylinder 71 is provided with a top cover plate 99 secured in place by means of fastening screws 100. Passing through the cover plate is a supporting stud bolt 101 which is clamped to the cover plate by nut 102 and secured by lock nuts 103 to the slabbed extremity 104 of a cylindrical support bar 105 which is seated for turning movement in a bore 106 formed in the bracket-arm of the sewing machine. A slotted plate 107 secured to the machine frame extends within a peripheral groove 108 formed on the support bar to confine the bar in place in the bore 106 without limiting the turning movement of the bar. It will be appreciated that by this construction, the air cylinder 71 is pivotally supported with respect to the machine frame thus preventing binding of the piston rod 70.

Arranged on the piston rod 70 within the air cylinder are spaced circular piston disks 109 and 110 between which is arranged a packing disk 111 of flexible material to provide a substantially air tight engagement between the piston and the walls of the cylinder. The disks 109 and 110 are secured by a nut 112 to the piston rod 70 which is slidable in a bearing bushing 113 at the base of the air cylinder. Secured at the free end of the piston rod is an adaptor 114 which is bifurcated to embrace the flattened end portion 115 of the blade member 60. A series of holes 116 are formed in the flattened end portion 115 to accommodate selectively a pin 117 by which a connection is made with adaptor 114. Interposed between the piston disk 110 and the base of the air cylinder is a light coil-spring 118, the purpose of which is to lightly bias the presser mechanism into operative position when the pressure is exhausted from the system. The coil spring 118 serves merely to take up slack and lost motion in the parts of the pressure mechanism such that when pressure is again developed in the system, no sharp initial taking up of this slack will result.

In operation, the speed of the air pump and of the sewing machine bear a constant relation since both are driven from the clutch pulley. Provided only that a pump of sufficient capacity be utilized, it is a characteristic of the rotary vane type pump 72 that the pressure developed in the closed system provided by valve 85 will vary in a direct proportion to the speed of operation. Since the upward force exerted by the piston on the blade member 60 similarly varies directly with pressure of the air supplied, it follows that as the inertia forces in the presser mechanism increase with the speed, the controlling force imparted through the blade member will be correspondingly increased and thus automatically compensated for.

Moreover, the controlling force imparted to the presser mechanism by the fluid system of the present invention at any one speed will remain constant despite a change in the thickness of the work, because the force developed by the air pressure is the same regardless of the position of the piston in the air cylinder excepting, of course, for a momentary slight variation in force during the actual transition.

Figure 4:
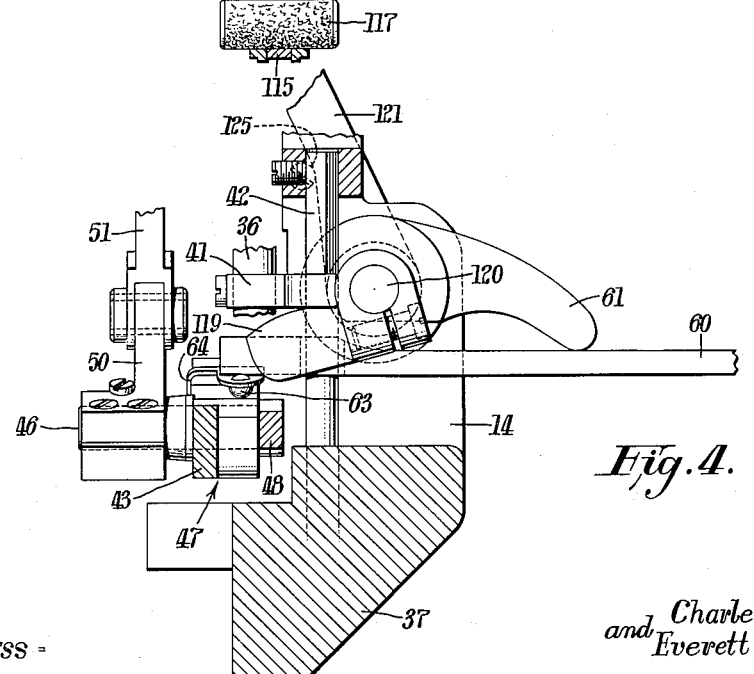
Fig. 4 is an enlarged vertical sectional view taken substantially along line 4—4 of Fig. 2.

An additional characteristic of the rotary vane type pump chosen for use in the preferred embodiment is that the pump acts automatically as a relief valve to permit the immediate release of any pressure in the system over that pressure then being delivered by the pump. Thus, as the speed of operation is being reduced, the pump will automatically dissipate any back pressure in the system. As one particular example of this relief valve aspect, when the machine is brought to rest, the pump will immediately release all of the air pressure from the system, thus removing all of the force upon the blade member due to the fluid system. As a result a relatively simple and efficient presser lifting device may be used, since only the resistance of the small lost motion controlling coil-spring 118 must be overcome. Referring particularly to Figs. 1 and 4, such a presser lifting device in preferred form comprises a presser-bar lifting cam lug 119 which extends beneath the presser-bar guide bracket 41 and is clamped to a pivot shaft 120 journaled transversely in the fulcrum finger 61. An upstanding rock arm 121 which is also fixed to the pivot shaft 120 is connected by means of a link 122 to a bell crank 123 which is pivoted to the bracket-arm. By means of a chain 124 connecting the bell crank to any suitable treadle or knee shifter (not shown), the cam lug 119 may be turned to lift the presser device. A stop pin 125, which extends from the sewing head engages the rock arm 121 to determine the operative position of the fulcrum finger 61.

Figs. 5 and 6 illustrate a modified form of valve construction together with an arrangement whereby the air which is bled from the system may be directed for a useful purpose rather than being merely exhausted to the atmosphere as is the case with the construction of Fig. 1. As shown in Fig. 5, the valve is arranged to deliver the bled air into a flexible hose 130 which is supported by a sleeve 131 and a clamp 132 from the bracket-arm. The flexible hose 130 is connected to a needle cooling air nozzle 133 which is supported from the sewing head by means of a split clamp 134 which embraces both the nozzle 133 and a rod 135 which depends from a bracket 136 fixed to the sewing head. Referring more particularly to Fig. 6, the body portion 87 of the valve is counterbored to provide a conical seat 137 for a valve ball 138. An adjustable adapter 139 is threaded into the counterbore and serves to confine a coil spring 140 against the valve ball 138. A lock nut 141 is provided in order to maintain the adapter 139 in any selected position of adjustment in the counterbore thus providing a fine adjustment for the valve controlling spring 140. A hose fitting 142 carried by the adapter delivers the air which is bled from the system to the hose 130.

The scope of the present invention, it will be understood, is not limited to the use of a centrifugal or a rotary vane type pump. A positive displacement type pump may be used or air under a constant pressure from an outside source may be utilized. However, if either of these alternatives are used, the system must include means comparable to the automatic pressure controlling valve aspect of the pump of the preferred embodiment for regulating the pressure of the air delivered to the air cylinder in a direct proportion to the speed of operation of the sewing machine.

It will also be appreciated that the air pump and air pressure controlling means need not necessarily be associated with the transmitter clutch pulley. The pump may be actuated by any moving part which is responsive to the speed of operation of the sewing machine.

Having thus set forth the nature of the invention, what we claim herein is:

1. In a sewing machine having stitch-forming instrumentalities, a driving mechanism operatively connected to actuate said stitch-forming instrumentalities, a stitch by stitch work advancing feed mechanism supported in said sewing machine, and a work-engaging presser mechanism carried by said sewing machine in opposition to said work feeding mechanism, the improvement which comprises the combination of a fluid pressure operated device carried by said sewing machine, operative connections between said device and said presser mechanism, a controlling mechanism for selectively varying the speed of operation of said stitch-forming instrumentalities relative to the speed of operation of said driving mechanism, said controlling mechanism including a clutch and a brake and clutch and brake regulating mechanism under control of the sewing machine operator, and presser operating fluid pressure controlling means under control of said clutch and brake regulating mechanism.

2. In a sewing apparatus comprising a supporting table, a sewing machine mounted on said table, said sewing machine having stitch-forming instrumentalities and a work-engaging presser mechanism, an electric motor carried by said supporting table and including a rotary motor shaft, driving connections arranged between said electric motor shaft and said stitch-forming instrumentalities, a fluid pump supported on said electric motor and driven thereby, a fluid pressure operated device carried by said sewing machine and arranged to bias said presser mechanism into predetermined position in response to fluid pressure delivered by said pump, speed regulating mechanism associated with said driving connections for selectively varying the speed of operation of said stitch-forming instrumentalities, said speed regulating means being under manual control of the sewing machine operator, and fluid pressure regulating means under control of said speed regulating mechanism.

3. In a sewing machine, a presser device supported for vibratory movement incident to operation of said sewing machine, a fluid system biasing said vibratory member into normal operative position, said system comprising a rotary vane type pump, a power transmitter having a clutch controlled sewing machine driving pulley thereon, clutch regulating means under control of the machine operator for selectively varying the speed of operation of said driving pulley, said pump supported on said transmitter and operatively connected with said driving pulley, a cylinder supported by said sewing machine and arranged in communication with said pump, and a piston disposed in said cylinder and operatively connected with said presser device.

4. An alternating presser mechanism for a sewing machine comprising a presser-member supported for vertical reciprocatory movement, a work-feeding foot supported for orbital movement in a vertical plane, means alternately lifting said presser-foot and said feeding foot, said means comprising a lever fulcrumed on said sewing machine and pivotally connected with said work-feeding foot, a bell crank fulcrumed on said lever and arranged in pivotal engagement with said presser-member, and mechanism actuated by said sewing machine and arranged to oscillate said bell crank, pneumatic means biasing said presser-member and said feeding foot into lowered position comprising a blade pivoted on said sewing machine and disposed to engage said lever, a piston operatively connected to said blade, a pneumatic pump operatively arranged in speed responsive relation with said sewing machine, and an air duct extending between said pump and said piston.

5. In a sewing machine having a stitch-forming mechanism including a needle and a presser mechanism, a normally closed pneumatic system pressure responsive to the speed of operation of the sewing machine for biasing said presser mechanism into operative position, a needle cooling air nozzle carried by said sewing machine, an adjustable pressure relief valve arranged in said pneumatic system, and a conduit extending from the discharge of said pressure relief valve to said needle cooling air nozzle.

6. In a sewing machine having cyclically operated work manipulating instrumentalities, operating mechanism therefor, means associated with said operating mechanism for selectively varying the speed of operation of said sewing machine, a member acted upon by repetitive varying forces imparted by said work manipulating instrumentalities incident to the operation of said sewing machine, said member being supported on said sewing machine for bodily movement in response to said repetitive forces, means for biasing said bodily movable member toward a predetermined normal operating position, said means comprising a fluid chamber, means for delivering fluid under pressure into said chamber, means drivingly connected with said sewing machine operating mechanism for varying the pressure of said fluid in said chamber in a substantially direct proportion to the speed of operation of said sewing machine, a movable element forming a portion of said fluid chamber and defining a surface acted upon by said fluid pressure, said bodily movable member having a bearing extension connected thereto, said movable element bearing upon said extension to transmit forces imparted by said fluid pressure on said movable element to said bodily movable member in opposition to said repetitive forces.

7. A device as set forth in claim 6 in which the means for delivering fluid under pressure into said chamber constiutes a pump of the type which delivers fluid under pressure substantially in a direct proportion to the speed of pump operation, and in which the means for varying the pressure of the fluid in the chamber constitutes a driving connection of fixed speed ratio between said pump and said sewing machine actuating mechanism.

8. A device as set forth in claim 6 in which said fluid chamber includes a cylinder supported on said sewing machine, an endwise movable piston arranged in said cylinder and means operatively connecting said piston to bear on the bearing extension of said bodily movable member to transmit forces imparted by said fluid pressure on said piston to said bodily movable member in opposition to said repetitive forces.

9. In a sewing machine having a work support, cyclically operated work manipulating mechanism, means associated with said operating mechanism for selectively varying the speed of operation of said sewing machine, a presser member supported on said sewing machine for bodily movement toward and away from said work support, said work manipulating instrumentalities being arranged to impart repetitive varying forces to said presser member incident to the operation of said sewing machine, means for biasing said presser member toward said work support comprising a fluid chamber, means for delivering fluid under pressure into said chamber, means drivingly connected with said sewing machine operating mechanism for varying the pressure of said fluid in said chamber in substantially direct proportion to the speed of operation of said sewing machine, a movable element forming a portion of said fluid chamber and defining a surface acted upon by said fluid pressure, said presser member having a bearing extension connected thereto, and said movable element bearing upon said extension.

References Cited in the file of this patent

UNITED STATES PATENTS

| | | |
|---|---|---|
| 2,390,329 | Runcie et al. | Dec. 4, 1945 |
| 2,423,996 | Rubel | July 15, 1947 |
| 2,527,353 | Christian | Oct. 24, 1950 |
| 2,541,888 | Pinkvoss | Feb. 13, 1951 |
| 2,555,095 | Reece | May 29, 1951 |
| 2,573,359 | Rich | Oct. 30, 1951 |